(12) United States Patent
Schorn et al.

(10) Patent No.: US 7,234,568 B2
(45) Date of Patent: Jun. 26, 2007

(54) HIGH PERFORMANCE DISK BRAKE

(75) Inventors: Michaël Schorn, Milan (IT); Giovanni Mario Tironi, Bergamo (IT); Giovanni Gotti, Bergamo (IT); Enrico Battista Ongaretti, Bergamo (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 10/508,824

(22) PCT Filed: Jan. 20, 2003

(86) PCT No.: PCT/IT03/00039

§ 371 (c)(1),
(2), (4) Date: Sep. 22, 2004

(87) PCT Pub. No.: WO2004/067984

PCT Pub. Date: Aug. 12, 2004

(65) Prior Publication Data

US 2005/0139438 A1 Jun. 30, 2005

(51) Int. Cl.
*F16D 55/00* (2006.01)
(52) U.S. Cl. ............ 188/73.47; 188/71; 188/73.39; 188/73.46
(58) Field of Classification Search ........... 188/71.1, 188/71.4, 73.1, 73.39, 73.42, 73.43, 73.44, 188/73.45, 73.46, 73.47
See application file for complete search history.

(56) References Cited

U.S. PATENT DOCUMENTS

| | | | | |
|---|---|---|---|---|
| 3,053,346 | A | | 9/1962 | Butler ................... 188/73 |
| 5,181,588 | A | * | 1/1993 | Emmons ............... 188/73.31 |
| 5,363,944 | A | * | 11/1994 | Thiel et al. ............ 188/73.31 |
| 5,535,856 | A | * | 7/1996 | McCormick et al. .... 188/73.36 |
| 5,564,532 | A | | 10/1996 | Baba et al. ............. 188/73.9 |
| 6,047,795 | A | | 4/2000 | Kobayashi et al. ...... 188/73.45 |
| 6,131,706 | A | * | 10/2000 | Gotti et al. ............. 188/72.4 |
| 2003/0178261 | A1 | * | 9/2003 | Ciotti et al. ............ 188/73.43 |

FOREIGN PATENT DOCUMENTS

| | | | | |
|---|---|---|---|---|
| GB | 1500907 | | 2/1978 | .............. 55/224 |
| JP | 57018826 | | 1/1982 | .............. 55/224 |
| JP | 08004800 | | 1/1996 | .............. 55/224 |

* cited by examiner

*Primary Examiner*—Devon Kramer
(74) *Attorney, Agent, or Firm*—Sofer & Haroun, LLP

(57) ABSTRACT

A support bracket for a disk brake of the type having a floating caliper comprises securing means for securing the support bracket to the suspension of a vehicle, and support means suitable for slidably supporting a sliding caliper body. The support bracket comprises an inner wall facing the inside of the vehicle and an outer wall opposite the inner wall and spaced therefrom. The inner wall and the outer wall are fixedly joined and arranged one on each side of a disk plane and delimit a space for accommodating a portion of a brake disk. Each of the inner wall and the outer wall forms two pad seats for accommodating pads.

20 Claims, 4 Drawing Sheets

HIGH PERFORMANCE DISK BRAKE

RELATED APPLICATION

This application is National Stage Application of PCT Application No. PCT/IT03/00039 filed on Jan. 30, 2003, the entirety of which is incorporated herein by reference.

BACKGROUND OF THE INVENTION

The present invention relates to a disk brake, particularly for high performance motor vehicles, of the type comprising a support bracket having opposing walls provided with seats for accommodating respective pads, and a sliding caliper body provided with seats for accommodating hydraulic pistons for urging the pads against one another.

As is known, disk brakes of the type specified, while being satisfactory for use in medium performance vehicles with brake disks of modest dimensions, have considerable disadvantages for use in heavy, high performance vehicles which require high braking performance. High performance vehicles, in order to have available an adequate braking power, require the use of brake disks and pads having large dimensions. This involves an increase in the dimensions of the support bracket and also of the caliper body and, consequently, an increase in the lever arms which, together with the high braking force, give rise to excessive stresses on and deformation of the brake. In addition, an increase in the dimensions of the pads and an increase in the braking force involve the problem of non-uniform wear on the pads and the problem of dimensioning and positioning the hydraulic thrust units. In order to ensure reliable operation, the individual components of the brake, in particular the slideways of the sliding caliper body, have to be over-dimensioned, which involves increased production costs.

SUMMARY OF THE INVENTION

The object of the present invention is therefore to provide a high performance disk brake that is suitable for the use of large-dimensioned brake disks and that has features such as to remedy the disadvantages mentioned with reference to the prior art.

This and other objects are achieved by means of a disk brake having a support bracket, comprising securing means for securing the support bracket to the suspension of a vehicle, support means suitable for slidably supporting a caliper body, wherein the support bracket comprises an inner wall facing the inside of the vehicle and an outer wall opposite the inner wall and spaced therefrom, the inner and outer walls being fixedly joined and arranged one on each side of a disk plane which defines the plane in which the brake disk lies, delimiting a space for accommodating a portion of the brake disk, wherein each of the inner and outer walls forms two pad seats, each pad seat being suitable for accommodating a pad and comprising two stop surfaces, which are substantially opposite one another, for stopping the pad in two opposite directions.

BRIEF DESCRIPTION OF THE DRAWINGS

In order better to understand the invention and to appreciate the advantages thereof, a description of one of its embodiments is given hereinafter by way of non-limiting example, with reference to the appended drawings in which.

DETAILED DESCRIPTION OF THE DRAWINGS

Figure 1:
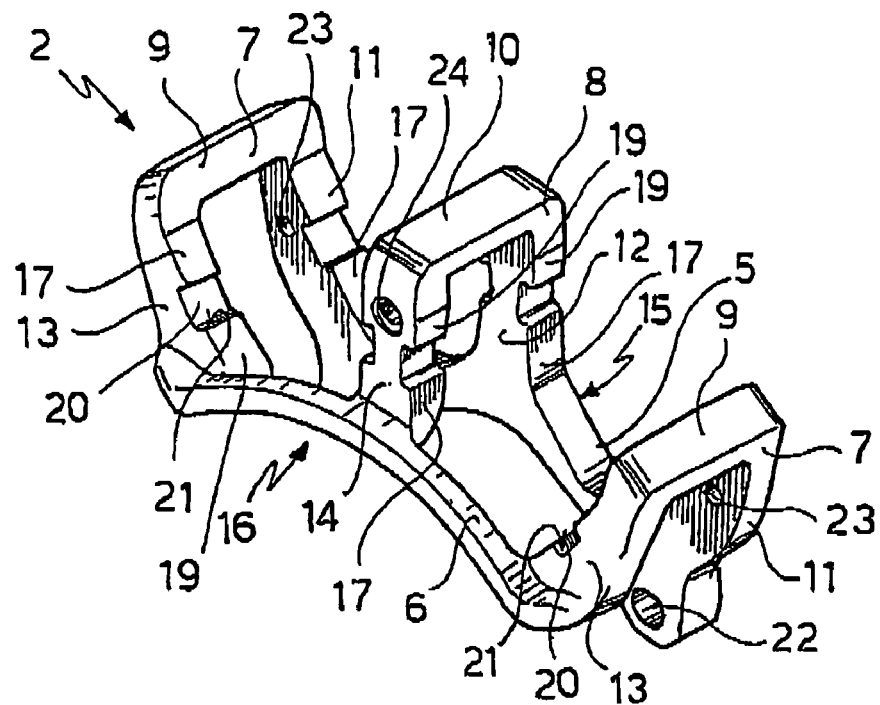
FIG. 1 is a perspective view of a support bracket according to the invention.

Referring to the drawings, a disk brake 1 comprises a support bracket 2 and a sliding caliper body 3, which is supported, preferably at three points, by the support bracket 2 in such a manner that it can slide along an axis transverse to a disk plane in which a brake disk 4 lies.

Figure 2:
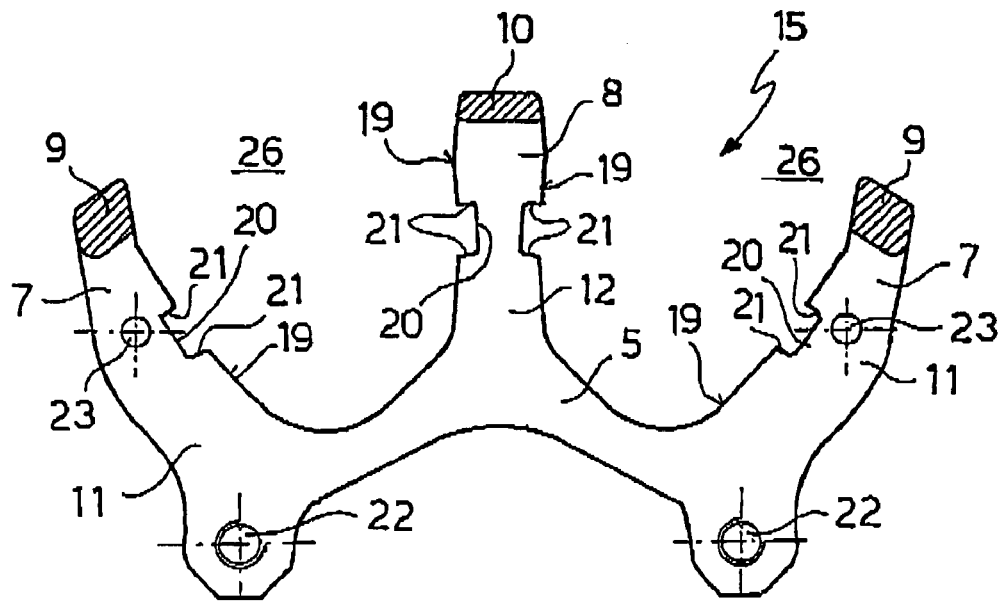
FIG. 2 is a sectional view of the support bracket in FIG. 1.

With reference to FIGS. 1 and 2, the support bracket 2 comprises an inner cross member 5 which, when the brake has been mounted, will face the inside of the vehicle, and an opposite outer cross member 6 facing the outside of the vehicle. The inner cross member 5 and the outer cross member 6 are fixedly joined to one another by two substantially U-shaped lateral yokes 7 and a central yoke 8, which is likewise substantially U-shaped and which is arranged between the lateral yokes 7, preferably half-way between them.

The cross members 5, 6 extend one on each side of the disk plane, preferably parallel therewith, and the lateral yokes 7 and the central yoke 8 lie in planes substantially transverse to the disk plane and are constructed in such a manner that they straddle the braking band of the brake disk 4. More precisely, the yokes 7, 8 comprise a base 9, 10, which intersects the disk plane, and also an inner wing 11, 12 which is fixedly joined, preferably by means of the end remote from the base, to the inner cross member 5, and an outer wing 13, 14 which is fixedly joined, preferably by means of the end remote from the base, to the outer cross member 6. The lateral yokes 7 and the central yoke 8 advantageously lie in planes which are inclined relative to one another and which are preferably substantially radial with respect to a disk axis which defines the axis of rotation of the brake disk 4, when the brake and the disk have been assembled.

The inner wings 11, 12 of the yokes 7, 8 therefore form, together with the inner cross member 5, an inner wall 15 facing the inside of the vehicle, and the outer wings 13, 14 of the yokes 7, 8 and the outer cross member 6 form an outer wall 16 opposite the inner wall and spaced therefrom in such a manner as to delimit a space for accommodating a portion of the braking band of the brake disk 4.

Advantageously, each of the inner wall 15 and the outer wall 16 delimits two pad seats 17 for accommodating pads 18, so that the support bracket 2 accommodates four pads 18 of modest dimensions, two on each side of the brake disk 4, in order to form a large total friction surface.

Each pad seat 17 comprises two stop surfaces 19 which are substantially opposite one another and preferably radial with respect to the disk axis and which are destined to stop the pad 18 in the two opposite circumferential directions of the brake disk 4. The two opposite stop surfaces 19 of each pad seat 17 are formed respectively by a flank of a wing 12, 14 of the central yoke 8 and by a facing flank of a wing 11, 13 of one of the lateral yokes 7 of the same wall 15, 16.

Each of the stop surfaces 19 also comprises a substantially rectangular recess 20 capable of accommodating, preferably by means of the interposition of a suitable resilient element, a corresponding protuberance of the pad 18. The recesses 20, formed on both flanks of the central wings 12, 14 and on those flanks of the lateral wings 11, 13 which face the central yoke 8, have two check surfaces 21 which are opposite one another and substantially transverse to the respective stop surfaces 19. The check surfaces 21 are provided in order to prevent undesired radial movements of the pads 18.

The inner wall 15 of the support bracket 2 also comprises two securing holes 22 suitable for receiving corresponding securing screws for connecting the support bracket 2 to a stub axle of the vehicle's suspension, while the brake disk 4 is secured, in known manner, to a wheel of the vehicle. The securing holes 22 are advantageously arranged in suitable portions of the inner cross member 5 at the location of the lateral yokes 7.

The inner cross member 5 and the outer cross member 6 are substantially arc-shaped, preferably extending along a circumference around the disk axis.

In the embodiment shown in FIG. 1, the inner cross member 5 is substantially aligned with the inner wings 11, 12 while the outer cross member 6 has a rib which extends along the entire outer cross member 6 and projects towards the outside of the support bracket 2.

A lateral hole 23 is formed in both of the inner wings 11 of the lateral yokes 7 and a central hole 24 is formed in the outer wing 14 of the central yoke 8. The lateral holes 23 and the central hole 24 are suitable for receiving lateral slide pins 37 and a central slide pin 25 for the sliding support of the sliding caliper body 3, forming in particular a support for the caliper body 3, which is slidable transversely to the disk plane, at three points or along three guide lines defined by the pins 37, 25.

At the location of the pad seats 17, the support bracket 2 has two large openings 26 arranged respectively between the central yoke 8 and the lateral yokes 7.

Figure 4:
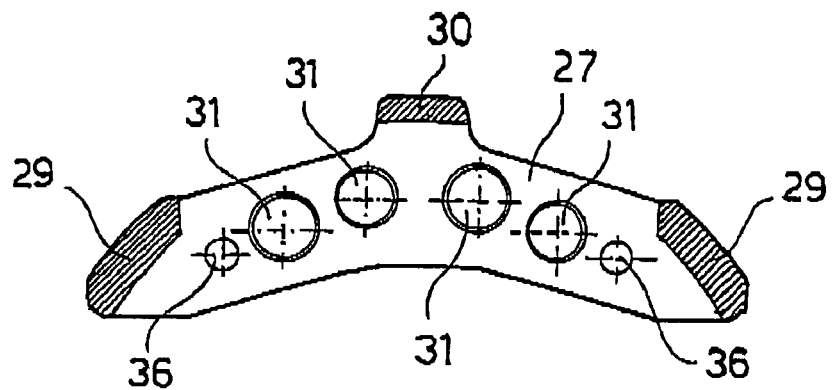
FIG. 4 is a sectional view of the caliper body in FIG. 3.
Figure 3:
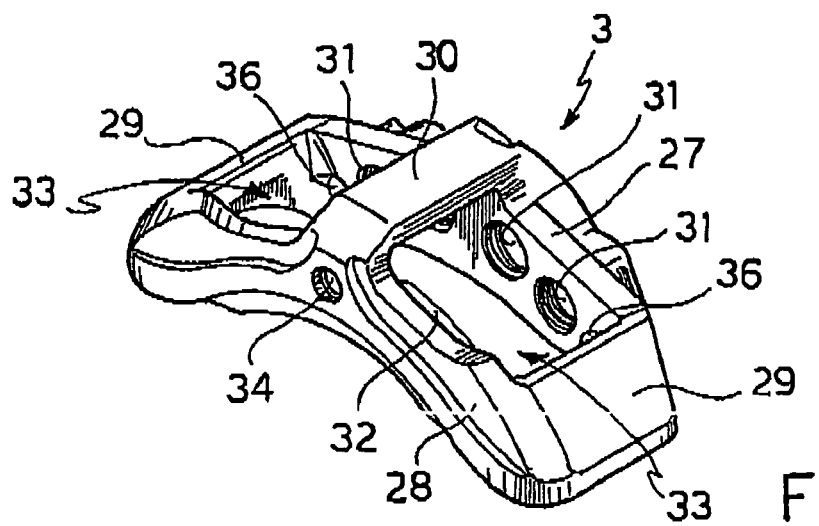
FIG. 3 is a perspective view of a sliding caliper body of the disk brake according to the invention.
Figure 5:
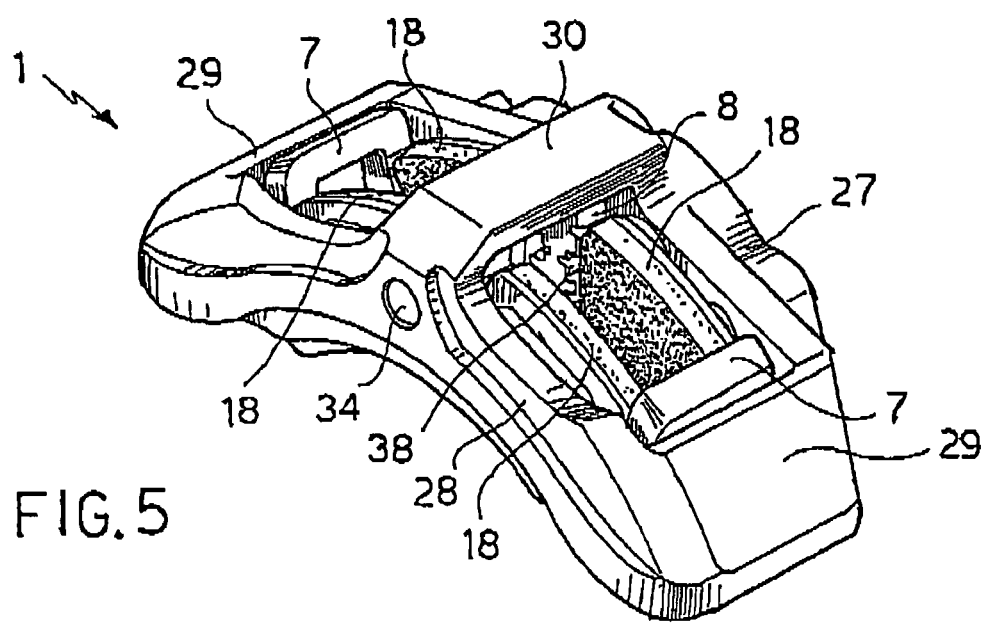
FIG. 5 is a perspective view of the disk brake according to the invention.
Figure 6:
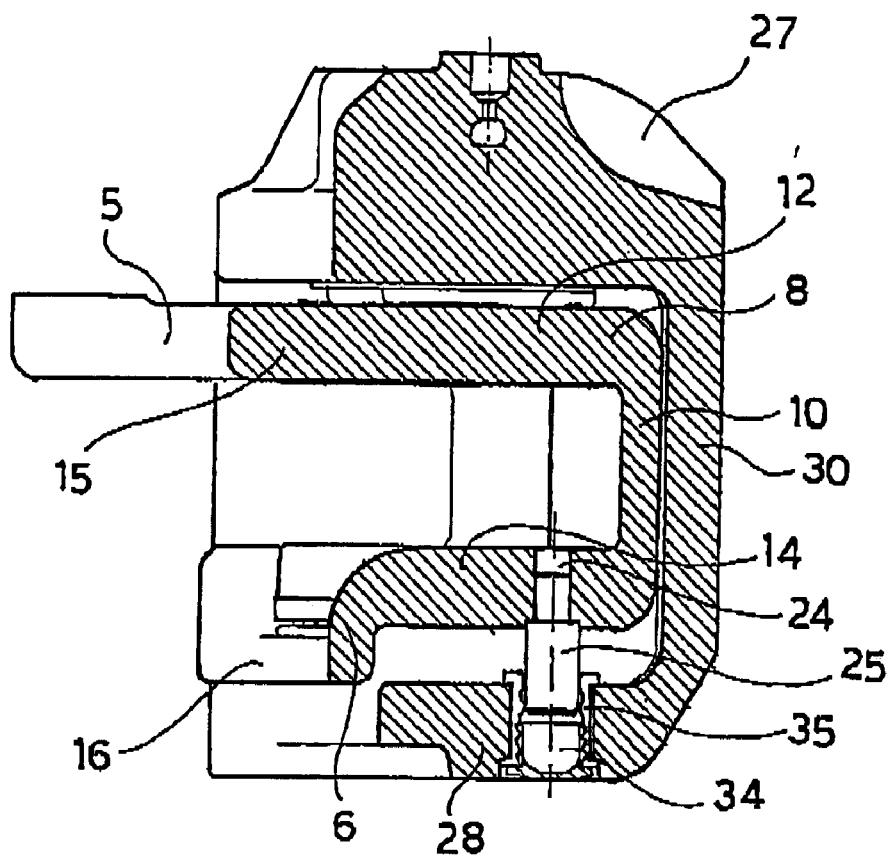
FIG. 6 is a sectional view taken on the line VI-VI in FIG. 8.
Figure 7:
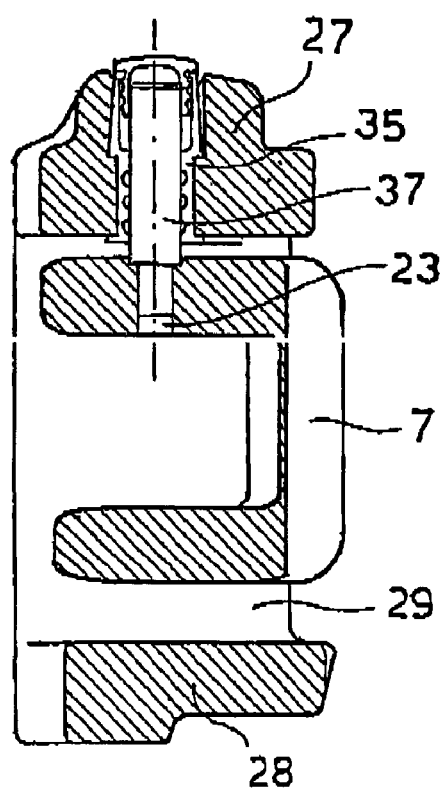
FIG. 7 is a sectional view taken on the line VII-VII in FIG. 8.
Figure 8:
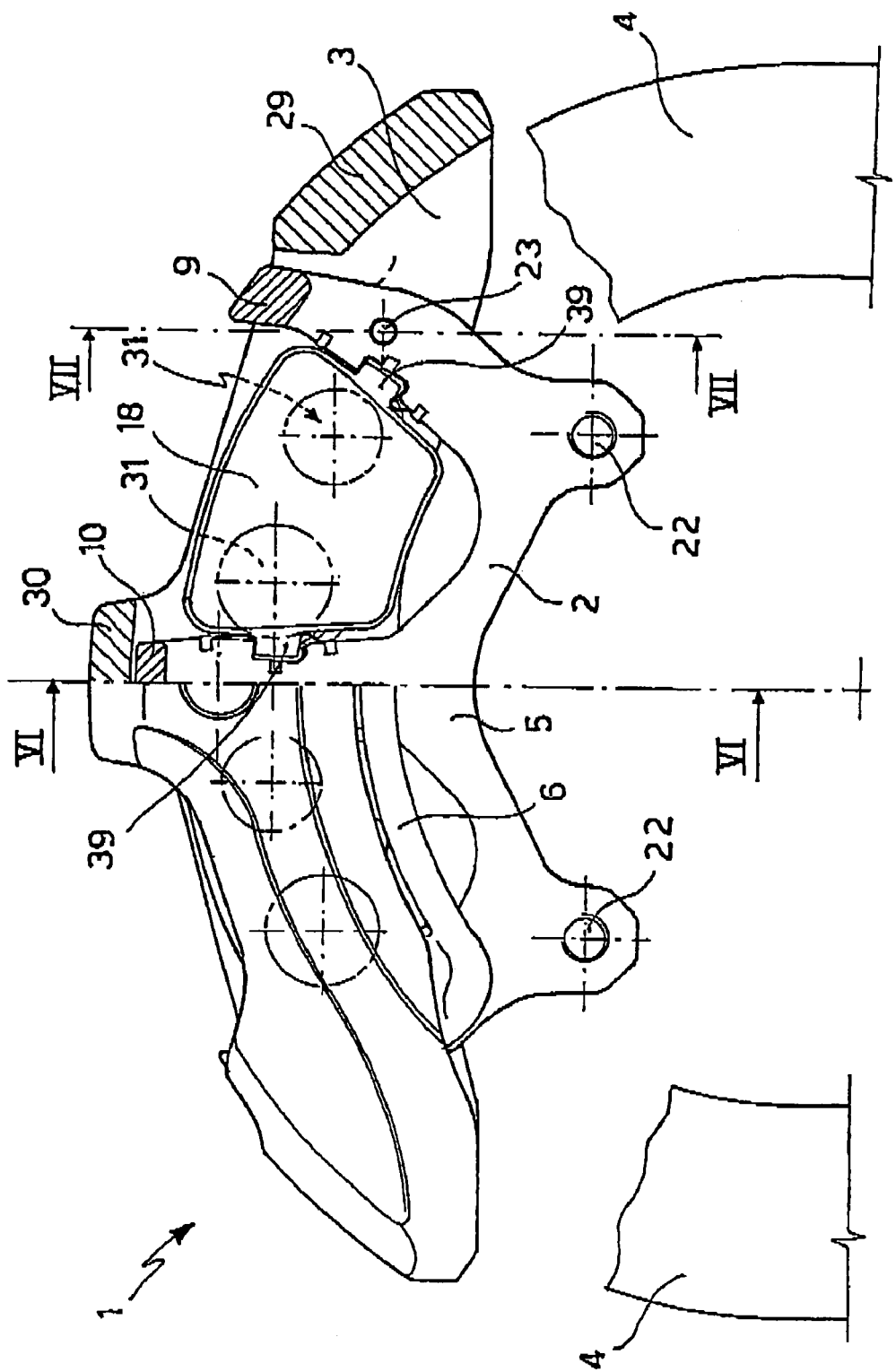
FIG. 8 is a partially sectioned front view of the disk brake according to the invention.

With reference to FIGS. 3 and 4, the caliper body 3 comprises an inner portion 27 which, when the brake has been mounted, will face the inside of the vehicle, and an opposite outer portion 28 facing the outside of the vehicle. The inner portion 27 and the outer portion 28 are spaced from one another in such a manner as to enable the support bracket 2 to be positioned between them and are fixedly joined, preferably by means of two lateral bridge elements 29 arranged at the location of the opposite ends of the portions 27, 28, and a central bridge element 30 arranged between the lateral bridge elements 29, preferably half-way between them. The lateral bridge elements 29 and the central bridge element 30 straddle the support bracket 2 and have an elongate cross-section which extends preferably along an arc of a circle, advantageously around the disk axis. Preferably, the lateral bridge elements 29 have a cross-sectional surface larger than the cross-sectional surface of the central bridge element 30.

The inner portion 27 and the outer portion 28, together with the lateral bridge elements 29 and the central bridge element 30, delimit two large openings 33 disposed substantially at the location of the openings 26 of the support bracket 2, or at the location of the pads 18.

The inner portion 27 of the caliper body 3 is provided with four seats 31 for hydraulic pistons for acting on the two pads 18 arranged on the inner wall 15 of the support bracket 2, wherein two piston seats 31 and, consequently, two hydraulic pistons, are associated with each of the two pads 18.

The outer portion 28, on the other hand, is provided with suitable reaction surfaces 32 for checking the thrust transmitted by the pads 18 located on the outer wall 16 of the support bracket 2.

According to one embodiment, the four piston seats 31 are arranged substantially along an arc of a circle, preferably around the disk axis. Advantageously, the two seats, or the two hydraulic pistons, which are associated with a respective pad, have different diameters. In particular, the piston that is arranged upstream in the principal direction of rotation of the braking band of the disk 4 has a diameter which is smaller than the diameter of the piston arranged downstream.

The caliper body 3 also comprises a central hole 34 formed in the outer portion 28 at the location of the central bridge element 30, and two lateral holes 36 formed in the inner portion 27 in the vicinity of each lateral bridge element 29, in order to receive in a slidable manner, preferably by means of the interposition of damping elements 35 of synthetic material, the lateral slide pins 37 and the central slide pin 25. The damping elements 35 are preferably composed of rubber and/or PTFE.

According to one embodiment, the lateral holes 36, and consequently the lateral slide pins 37, are arranged substantially on the same arc of a circle on which the piston seats 31 are also arranged.

FIGS. 5 to 8 show the assembled disk brake 1. The pads 18 are accommodated by the pad seats 17 of the support bracket 2. Resilient elements, for example springs 38, are provided at the location of the stop surfaces 19, in particular in the recess 20, in order to hold the pads 18 in the pad seats 17 without vibration. The pads 18 comprise protuberances 39 that have a shape substantially complementary to the shape of the recesses 20 and that are suitable for engaging the latter, taking into account the spaces necessary for the interposition of the springs 38 between the recess 20 and the protuberance 39.

The pads 18 are therefore slidable in the direction transverse to the disk plane but are stopped, in the tangential or circumferential direction of the brake disk 4, by means of the stop surfaces 19 of the lateral yokes 7 and the central yoke 8, and, in the radial direction of the disk 4, by the check surfaces 21 of the recess 20.

The sliding caliper body 3 is fitted on the support bracket 2 and supported by the latter, by means of the lateral slide pins 37 and the central slide pin 25, in such a manner that it can slide transversely to the disk plane. When the brake 1 is in the assembled configuration, the bases 9 of the lateral yokes 7 are inserted in the openings 33 of the caliper body, and are also substantially adjacent to and aligned with the lateral bridge elements 29, while the central yoke 8 is arranged at the location of the central bridge element 30, preferably centred relative thereto.

According to one embodiment, both the support bracket 2 and the caliper body 3 are produced, preferably as a single piece, from an aluminium alloy. Alternatively, they are obtained from cast iron. Preferably, the support bracket 2 is produced from cast iron and the caliper body 3 is produced from an aluminium alloy.

The functioning of the disk brake according to the invention will be described hereinafter.

When braking occurs, owing to the thrust of the pistons against the pads 18, the caliper body 3 moves or floats along the slide pins 25, 37 until the two inner pads, on which the pistons act, and the two opposing outer pads, which are supported on the reaction surfaces 32, come into pressing contact with the braking band of the disk 4 and act upon it, over a large total surface, with equal and opposite forces.

Owing to the particular structure of the support bracket 2, the bracket transmits substantially all of the tangential component of the braking force without excessive deformation. Owing to the fact that the support bracket holds and supports all of the pads and owing to the sliding support of the caliper body 3 at three points, the latter is not substantially stressed by the tangential component of the braking force. Consequently, the sliding caliper body 3 is subjected only to the reaction force of the thrust of the hydraulic pistons.

The separation of the structural functions of the support bracket 2 and the caliper body 3 is further improved by means of the rubber damping elements 35 which permit the deformation, within given limits, of the support bracket 2 without activating the slide pins 25, 37 as rigid support points.

The simultaneous activation of, respectively, a lateral yoke 7 and the central yoke 8 in order to check the tangential force transmitted from the brake disk 4 to the pads 18, gives rise to a mutual stiffening of the yokes 7 and 8 involved, because the curvature of the cross members 5, 6 bent as a result of a movement of the lateral yokes opposes the curvature attributable to a movement of the central yoke.

The disk brake 1 permits efficient cooling of the disk 4 and of the pads 18 owing to the large openings 26, 33 of the support bracket 2 and the caliper body 3, which openings are aligned with one another and arranged at the location of the pads 18.

The disk brake according to the invention has numerous advantages.

Owing to the structure of the support bracket and to its special stiffness, the support bracket advantageously permits an increase in the total friction surface by means of the use of four pads and the use of brake disks of large diameter.

The disk brake according to the invention also enables the dimensions of the individual pads to be limited and the braking force to be distributed in such a manner as to ensure optimum braking performance and uniform wear of the pads.

Owing to the clear-cut separation of the structural functions of the support bracket and the sliding caliper body, the slide pins are not subject to stresses, except for the inherent weight of the caliper body, and the individual components of the disk brake can be designed in an optimised manner.

All of these advantageous features qualify the disk brake according to the invention in particular for use in high performance vehicles.

It will be appreciated that, in order to satisfy contingent and specific requirements, a person skilled in the art may introduce to the disk brake according to the invention further modifications and variants which are, moreover, all contained within the scope of protection of the invention as defined by the following claims.

What is claimed is:

1. A floating caliper disk brake comprising:
   a support bracket; and
   a caliper body supported by the support bracket in such a manner that it can slide along an axis transverse to a disk plane, said support bracket having a securing means for securing the support bracket to the suspension of a vehicle and support means suitable for slidably supporting the caliper body,
   wherein said support bracket includes an inner wall facing the inside of the vehicle and an outer wall apposite the inner wall and spaced therefrom,
   wherein the inner wall and the outer wall being fixedly joined and arranged one on each side of a disk plane which constitutes the plane in which the brake disk lies, delimiting a space for accommodating a portion of a brake disk,
   wherein the inner wall forms two pad seats and the outer wall forms two pad seats, each pad seat of said four pad seats being suitable for accommodating a pad and each pad seat of said four pad seats having two stop surfaces, which are substantially opposite one another, for stopping the pad in two opposite directions.

2. A disk brake according to claim 1, wherein said support bracket further comprises an inner cross member and an outer cross member which are connected to one another by two substantially U-shaped lateral yokes and a substantially U-shaped central yoke arranged between the lateral yokes, wherein the lateral yokes and the central yoke lie in planes substantially transverse to the disk plane and have a base which intersects the disk plane, and also an inner wing connected to the inner cross member and an outer wing connected to the outer cross member, wherein the inner wings of the lateral yokes and of the central yoke and the inner cross member constitute the inner wall and the outer wings of the lateral yokes and of the central yoke and the outer cross member constitute the outer wall.

3. A disk brake according to claim 2, wherein the central yoke is arranged halfway between the lateral yokes.

4. A disk brake according to claim 2, wherein the lateral yokes and the central yoke lie in planes which are substantially radial with respect to a disk axis constituting the axis of rotation of the brake disk.

5. A disk brake according to claim 2, wherein the stop surfaces opposite each pad seat are formed respectively by a wing of the central yoke and a wing of one of the lateral yokes of the same wall.

6. A disk brake according to claim 2, wherein the cross members are connected to those ends of the wings of the yokes which are remote from the base.

7. A disk brake according to claim 2, wherein the cross members are substantially parallel with the disk plane.

8. A disk brake according to claim 2, wherein the securing means further comprise two securing holes which are suitable for receiving corresponding securing screws and which are arranged in the inner cross member at the location of the lateral yokes.

9. A disk brake according to claim 2, wherein the support means further comprise two lateral holes, formed in the inner wings of the lateral yokes, and a central hole, formed in the outer wing of the central yoke, the lateral holes and the central hole being suitable for receiving slide pins for the sliding support of the sliding caliper body.

10. A disk brake according to claim 2, wherein the cross members are substantially arc-shaped and extend substantially along circumferences around the disk axis.

11. A disk brake according to claim 2, further comprising two openings disposed respectively between the central yoke and the lateral yokes.

12. A disk brake according to claim 1 wherein said caliper body supported at three paints by the support bracket in such a manner that it can slide along an axis transverse to the disk plane.

13. A disk brake according to claim 12, wherein the caliper body further comprises an inner portion facing the inside of the vehicle and an opposite outer portion which are fixedly joined to one another and spaced in such a manner as to enable the support bracket to be positioned between them, wherein the inner portion is provided with four piston seats for accommodating hydraulic pistons for acting on the pads arranged on the inner wall of the support bracket, and an outer portion is provided with suitable reaction surfaces for checking the thrust transmitted by pads arranged on the outer wall of the support bracket.

14. A disk brake according to claim 13, wherein two hydraulic pistons are associated with each of the two pads arranged on the inner wall of the support bracket.

15. A disk brake according to claim 13, wherein the for piston seats are arranged along an arc of a circle.

16. A disk brake according to claim 13, wherein the inner portion and the outer portion of the sliding caliper body are connected to one another by two lateral bridge elements which are arranged at the location of the opposite ends of the portions and by a central bridge element which is arranged substantially half-way between the lateral bridge elements, wherein the inner portion and the outer portion, together with the lateral bridge elements and the central bridge element, delimit two openings disposed at the location of the openings of the support bracket.

17. A disk brake according to claim 16, wherein said outer portion further comprises, at the location of the central bridge element, a central hole for receiving a central slide pin and the inner portion comprises, in the vicinity of both of the lateral bridge elements, a lateral hole for receiving two lateral slide pins, in order to form the three-point sliding support.

18. A disk brake according to claim 17, wherein a damping element is interposed between the holes and the slide pins.

19. A disk brake according to claim 1, wherein said inner wall and outer wall of said support bracket are connected to one another by two substantially U-shaped lateral yokes and a substantially U-shaped central yoke arranged between the lateral yokes.

20. A disk brake according to claim 1, wherein the two opposite stop surfaces of each pad seat of said four pad seats are formed respectively by a wing of a central yoke and a wing of one of lateral yokes of the same wall of said support bracket.

* * * * *

UNITED STATES PATENT AND TRADEMARK OFFICE
CERTIFICATE OF CORRECTION

| | | |
|---|---|---|
| PATENT NO. | : 7,234,568 B2 | Page 1 of 1 |
| APPLICATION NO. | : 10/508824 | |
| DATED | : June 26, 2007 | |
| INVENTOR(S) | : Michael Schorn | |

It is certified that error appears in the above-identified patent and that said Letters Patent is hereby corrected as shown below:

The Title page, Item no. (22) Please delete "January 20, 2003" and insert --January 30, 2003--.

Signed and Sealed this

Fourteenth Day of July, 2009

JOHN DOLL
*Acting Director of the United States Patent and Trademark Office*